US008445780B1

(12) United States Patent
Robins (10) Patent No.: US 8,445,780 B1
(45) Date of Patent: May 21, 2013

(54) ELECTRICAL DEVICE CONCEALING SYSTEM

(76) Inventor: Larry W. Robins, Elkton, SD (US)

(*) Notice: Subject to any disclaimer, the term of this patent is extended or adjusted under 35 U.S.C. 154(b) by 231 days.

(21) Appl. No.: 13/040,443

(22) Filed: Mar. 4, 2011

(51) Int. Cl.
*H05K 5/03* (2006.01)

(52) U.S. Cl.
USPC ............... 174/67; 174/53; 174/50; 174/481; 220/3.2; 220/3.8; 220/242

(58) Field of Classification Search
USPC .............. 174/480, 481, 50, 53, 57, 58, 66, 174/67, 482, 490, 491; 220/3.2–3.9, 4.02, 220/241, 242; 439/535, 536
See application file for complete search history.

(56) References Cited

U.S. PATENT DOCUMENTS

| | | | |
|---|---|---|---|
| 4,559,410 A | 12/1985 | Hostetter | |
| 4,613,728 A | 9/1986 | Lathrop | |
| 4,642,418 A | 2/1987 | Menchetti | |
| 4,758,687 A | 7/1988 | Lathrop | |
| 4,988,832 A | 1/1991 | Shotey | |
| 5,257,946 A | 11/1993 | MacMillan | |
| 6,086,390 A * | 7/2000 | Haut | 174/57 |
| 6,207,899 B1 * | 3/2001 | Gillespie | 174/66 |
| 6,265,662 B1 * | 7/2001 | Riedy et al. | 174/67 |
| 6,530,806 B2 * | 3/2003 | Nelson | 439/535 |
| 7,005,578 B2 * | 2/2006 | Gretz | 174/58 |
| 7,141,736 B2 | 11/2006 | Plankell | |
| 7,259,329 B1 | 8/2007 | Balma, Jr. | |
| 7,485,804 B2 * | 2/2009 | Dinh et al. | 174/50 |
| 7,557,308 B2 | 7/2009 | Dinh | |
| 8,115,100 B2 * | 2/2012 | Peckham | 174/67 |
| 8,124,888 B2 * | 2/2012 | Etemad-Moghadam et al. | 174/481 |
| 8,231,022 B2 * | 7/2012 | Goldenne et al. | 174/50 |
| 8,242,364 B1 * | 8/2012 | Shotey et al. | 174/66 |
| 2007/0051528 A1 | 3/2007 | Bangert | |

* cited by examiner

*Primary Examiner* — Angel R Estrada
(74) *Attorney, Agent, or Firm* — Neustel Law Offices (57) ABSTRACT

The apparatus includes a mount plate secured to a wall or ceiling panel and leading to an electrical device, a frame secured thereto, a plurality of magnetic or mechanical push-touch latches secured to the frame and adapted for inward/outward movement, and a cover magnetically or mechanically, such as a pin and socket attachment assembly, connected to the latches and movable with the latches, such as to be substantially flush with the frame in the inward position and extend outwardly from the frame in the outward position such as to permit removal for access to the electrical device. Various finishing materials may be applied over any exposed portions of the apparatus, such as the mount plate, portions of the frame, and cover to match the surrounding wall panel so that the invention is substantially unnoticeable along the wall panel. The cover may also include an opening for a daily use embodiment.

11 Claims, 8 Drawing Sheets

ELECTRICAL DEVICE CONCEALING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a concealing system and more specifically it relates to an electrical device concealing system for electrical devices in ceiling and wall applications, such as for concealing the electrical device from view yet permitting easy access to the device, such as to conform with federal, state, and local regulations.

2. Description of the Related Art

Any discussion of the related art throughout the specification should in no way be considered as an admission that such related art is widely known or forms part of common general knowledge in the field.

Many buildings, such as residential, industrial, and office, have electrical devices, such as outlets, switches, etc., that are installed along the wall, ceiling, or floor, but rarely, if ever used. The electrical devices are originally installed for various reasons, such as to comply with regulations, either local, state, federal, or company, or for possible future use. Often, it would be desired to hide these electrical devices from view; without permanently disabling the electrical device or blocking the electrical device, such as to violate certain electrical regulations. In addition, it is desired to hide the electrical device so as to permit access to the electrical device without the requirement of tools or electrical training.

Further, when constructing new buildings, there are times when not enough electrical devices are installed, such as for reasons of the user not wanting to constantly view the electrical devices when the electrical devices may or may not be in use. This results in the user often not having enough electrical devices to power or control future devices.

Because of the inherent problems with the related art, there is a need for a new and improved electrical device concealing system for electrical devices in ceiling and wall applications, such as for concealing the electrical device from view yet permitting easy access to the device, such as to conform with federal, state, and local regulations.

BRIEF SUMMARY OF THE INVENTION

A system for electrical devices in ceiling and wall applications, such as for concealing the electrical device from view yet permitting easy access to the device, such as to conform with federal, state, and local regulations. The invention generally relates to a concealing system which includes a mount plate secured to a wall or ceiling panel and leading to the electrical device, a frame secured to the mount plate, a plurality of magnetic or mechanical touch latches secured to the frame and adapted for inward and outward movement, and a cover connected to the latches and movable with the latches, such as to be substantially flush with the frame in the inward position and extends outwardly from the frame to permit the user to remove the cover for accessing the electrical device.

Various finishing materials may be applied over any exposed portions of the apparatus, such as the mount plate, portions of the frame, and cover to blend in and match the surrounding wall panel so that the invention is substantially unnoticeable along the wall or ceiling panel. The cover may also include an opening for a daily use embodiment of the invention.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate a electrical device concealing system 10, which comprises a mount plate 30 secured to a wall or ceiling panel 17 and leading to the electrical device 12, a frame 40 secured to the mount plate 30, a plurality of magnetic or mechanical touch latches 50 secured to the frame 40 and adapted for inward and outward movement, and a cover 60 connected to the latches 50 and movable with the latches 50, such as to be substantially flush with the frame 40 in the inward position and extends outwardly from the frame 40 to permit the user to remove the cover 60 for accessing the electrical device 12. The cover 60 is allowed to be easily removed from the latches 50 without requiring tools, such as to conform to UL Electrical Standard 514, among other federal, state, and local regulations, laws, codes, and National Electrical Code provisions.

Various finishing materials 70 may be applied over any exposed portions of the apparatus, such as the mount plate 30, portions of the frame 40, and cover 60 to blend in and match the surrounding wall panel 17 so that the invention is substantially unnoticeable along the wall or ceiling panel 17. An alternate cover 60' may also include an opening 62 for a daily use embodiment of the invention.

B. Electrical Device and Housing

Figure 2:
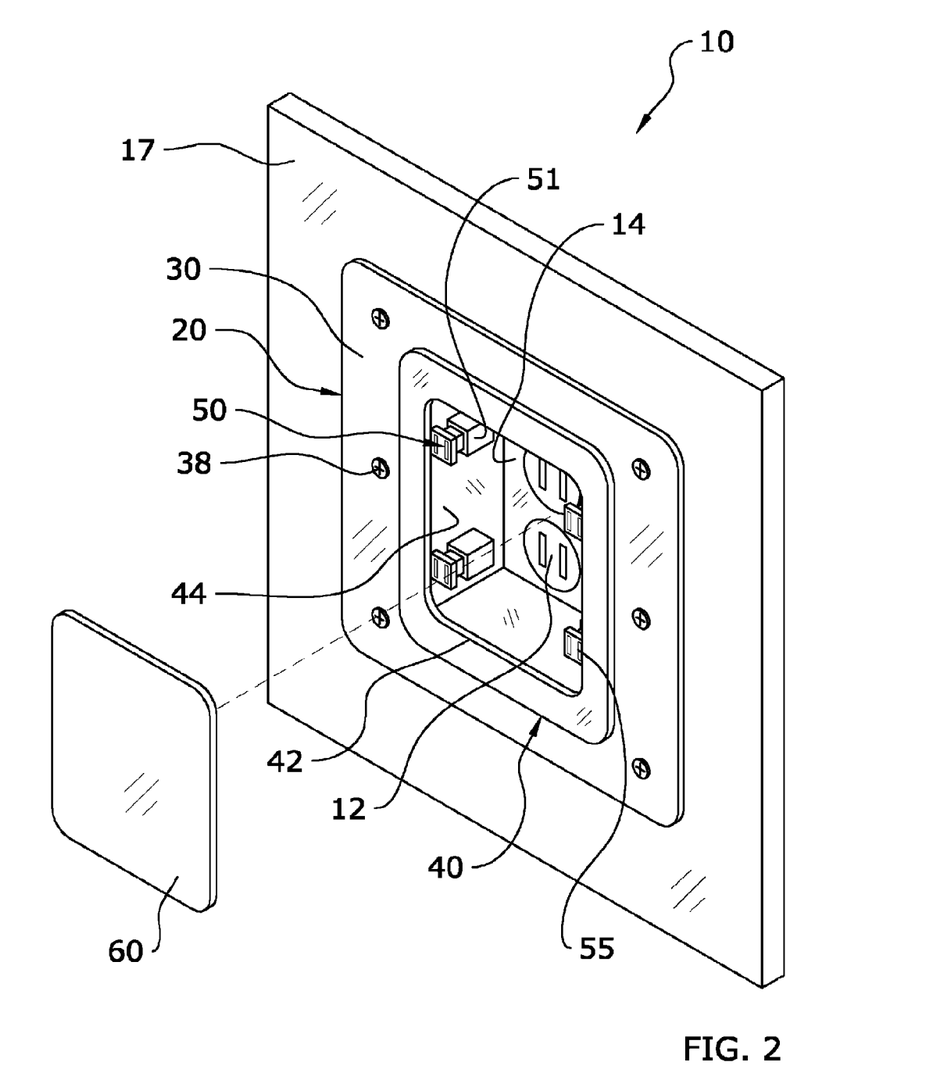
FIG. 2 is an upper perspective view of the present invention installed and with the cover exploded therefrom.

The present invention may be used to conceal various types of electrical devices 12, such as electrical outlets, communication sockets (E.g. phone jack, Ethernet jack), switches (E.g. light switches, appliance switches) or various other electrical devices. The electrical device 12 may be flush with the wall panel 17, semi-recessed, or fully-recessed as appreciated. The electrical device 12 is generally secured to a support stud either directly or through the use of a housing 13. The housing 13 is generally nonconductive and includes a rear wall 14, and sidewalls 15 and may extend forwardly from the electrical device 12 or be flush with the front of the electrical device 12. FIG. 2 illustrates a pair of electrical sockets as the electrical device 12; however it is appreciated that more or less electrical sockets may be concealed and/or combinations of electrical outlets, switches, and/or communication sockets.

C. Wall or Ceiling Panel

The present invention generally is secured to a wall or ceiling panel 17 as appreciated. The term "wall panel" and "ceiling panel" is not meant to be limiting throughout, wherein either "wall panel" or "ceiling panel" are interchangeable herein. Alternately, the present invention may be used with a floor panel. The present invention may further be used along an interior or exterior surface of the panel 17, such as to conceal electrical devices 12 accessible from the interior of a building or to conceal electrical devices 12 accessible from the exterior of a building. The wall or ceiling panel 17 also includes an opening 18 that is preferably directly aligned with the electrical device 12 and of a similar size as the interior of the housing 13.

D. Mount Assembly

The mount assembly 20 is for attaching to the wall panel 17 in a fixed manner. The mount assembly 20 may be comprised of various materials. The mount assembly 20 generally includes a mount plate 30, a frame 40, and a plurality of operative-latches 50. The mount plate 30 and the frame 40 may be comprised of separate structures as illustrated in FIG. 1 or may be comprised of an integral one-piece structure.

The mount plate 30 is generally comprised of a thin-plated structure having an outer diameter substantially larger than the opening 18 of the wall panel 17, such that perimeter openings 34 of the mount plate 30 may receive fasteners 38, such as screws, to be threaded into the wall panel 17 and secure the mount plate 30 to the wall panel 17. The mount plate 30 is also substantially thin so that a finishing material 70 may be applied thereover and blended with the surrounding wall panel 17. The mount plate 30 further includes a central opening 32 to align with the opening 18 of the wall panel 17. The mount plate 30 and opening 32 are generally comprised of a square or rectangular shape; however it is appreciated that alternate shapes may be utilized. Also, various materials may be utilized for the mount plate 30, such as plastic or metal.

Figure 1:
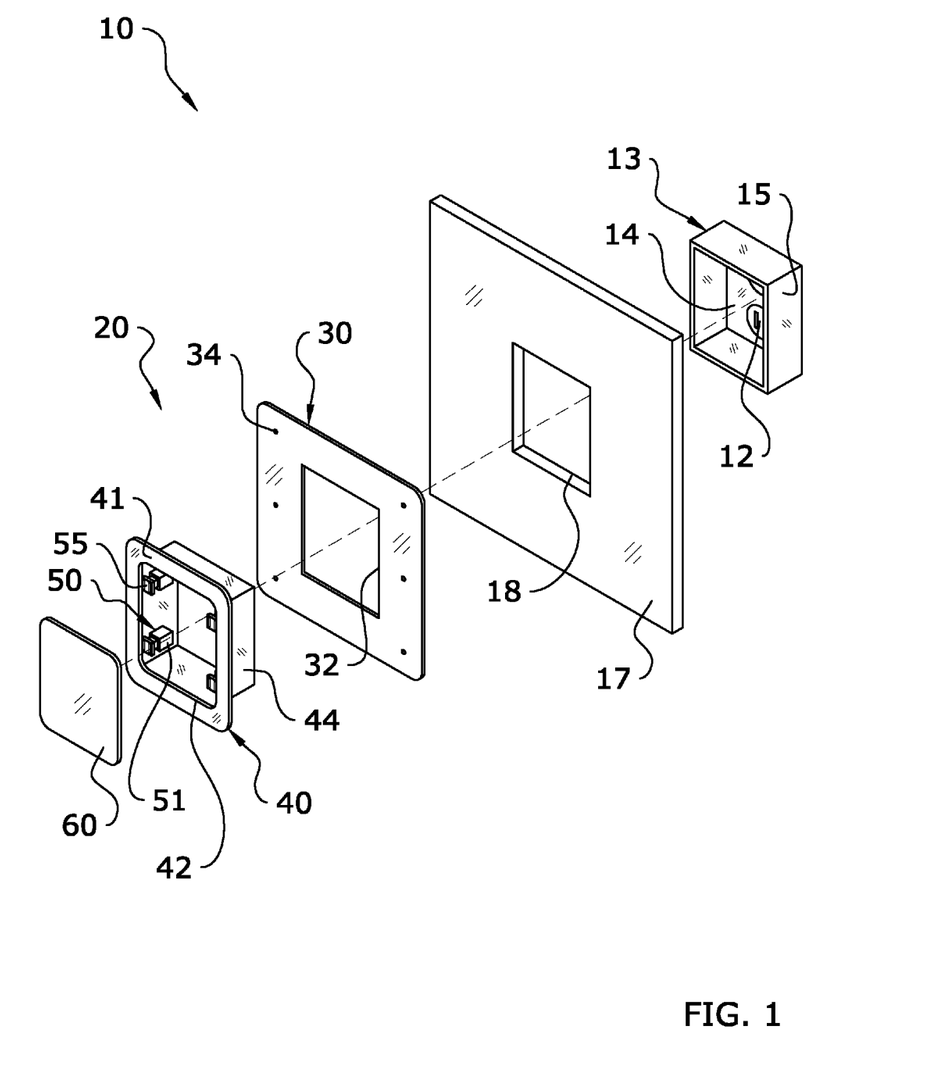
FIG. 1 is an exploded upper perspective view of the present invention.
Figure 7:
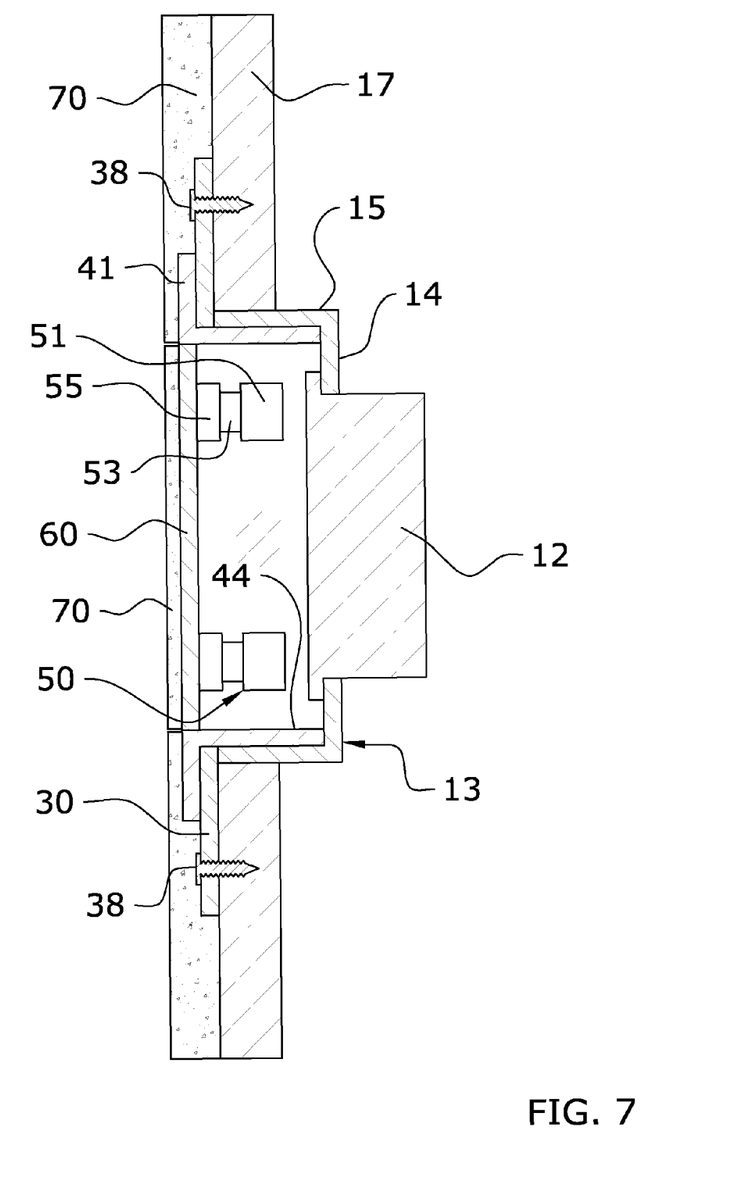
FIG. 7 is a side cross-sectional view of the present invention installed and illustrating the housing of the electrical device substantially flush with the exterior surface of the wall panel and a finishing material applied over the present invention.

The frame 40 generally includes a face trim 41 having an opening 42 and a plurality of flanges 44 extending from the face trim 41 in a perpendicular manner as illustrated in FIG. 1. The face trim 41 is generally comprised of a square-ring shaped-structure being thin such as to permit finishing material 70 to be applied thereover. The backside of the face trim 41 may be secured to the front side of the mount plate 30 in various manners, preferably through an adhesive substance or fastener 38 that is recessed from the front side of the face trim 41. The face trim 41 is also useful in that the face trim 41 extends outward from the mount plate 30 such as to allot room for the heads of the fasteners 38 to be within, wherein when the finishing material 70 is applied thereover the finishing material 70 is applied over the heads of the fasteners 38 and substantially flush with the face trim 41 such as illustrated in FIG. 7. The central opening 42 of the face trim 41 also aligns with the opening 32 of the mount plate 30 and the electrical device 12. As illustrated, the mount plate 30 is wider than the face trim 41 such as to permit space for the fasteners 38.

The flanges 44 extends from the face trim 41 perpendicularly inward such as to extend through the opening 18 of the wall panel 17 and the opening 32 of the mount plate 30 and line the interior side of the sidewalls 15 of the housing 13 of the electrical device 12. It is appreciated that the flanges 44 may be affixed to the sidewalls 15 of the housing 13 in various manners. The length of the flanges 44 may be shortened such as when the electrical device 12 and housing 13 are flush or substantially flush with the wall panel 17 such as illustrated in FIG. 7.

Figure 4:
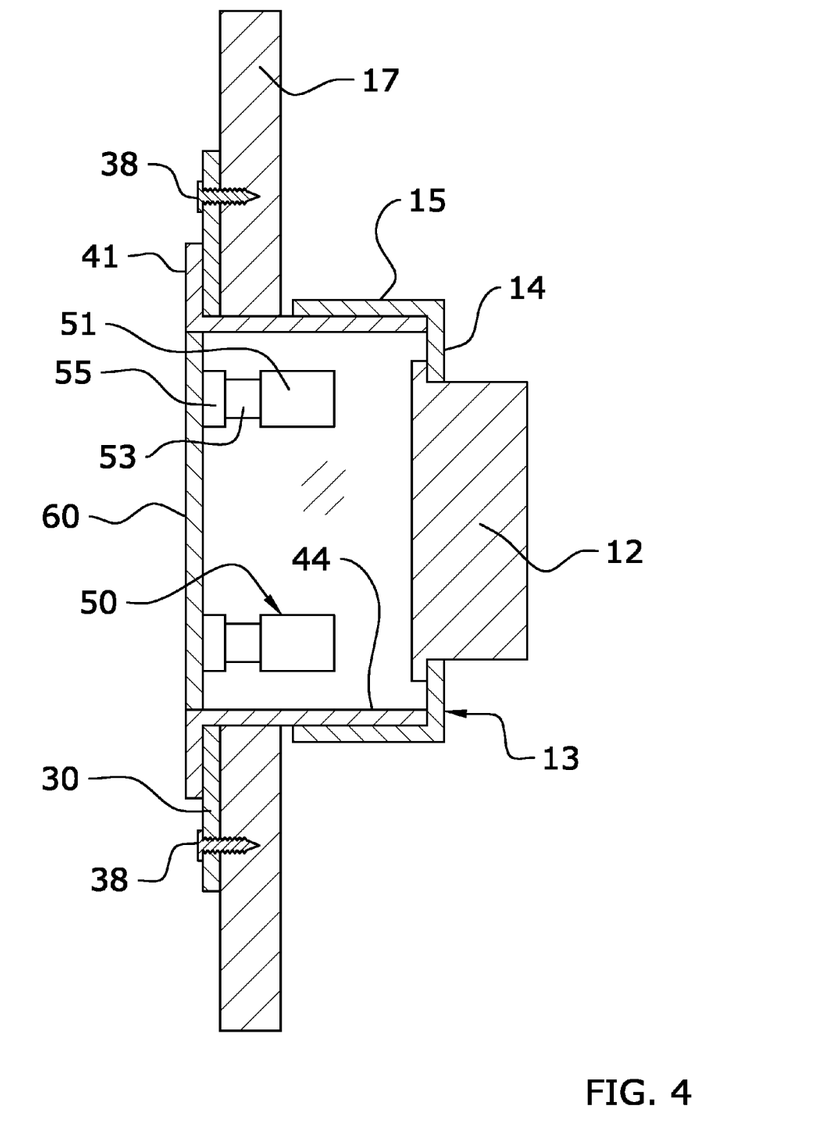
FIG. 4 is a side cross-sectional view of the present invention installed with the latches in the retracted position.

The latches 50 are attached to the flanges 44, preferably one or more latches 50 on each flange 44 or a pair of latches 50 on opposing side flanges 44 as illustrated in FIGS. 1, 2, and 4. The latches 50 are generally comprised of a touch push-latch 50 structure such as which permit for operation by simply applying an inward pushing-force upon the latch 50 which does not require any extra tools. More particularly, each latch 50 preferably includes a body 51 mounted to said flange 44, a spring-biased plunger 53 movable about the body 51, and a catch element 55 attached to the outer end of the plunger 53.

Figure 6:
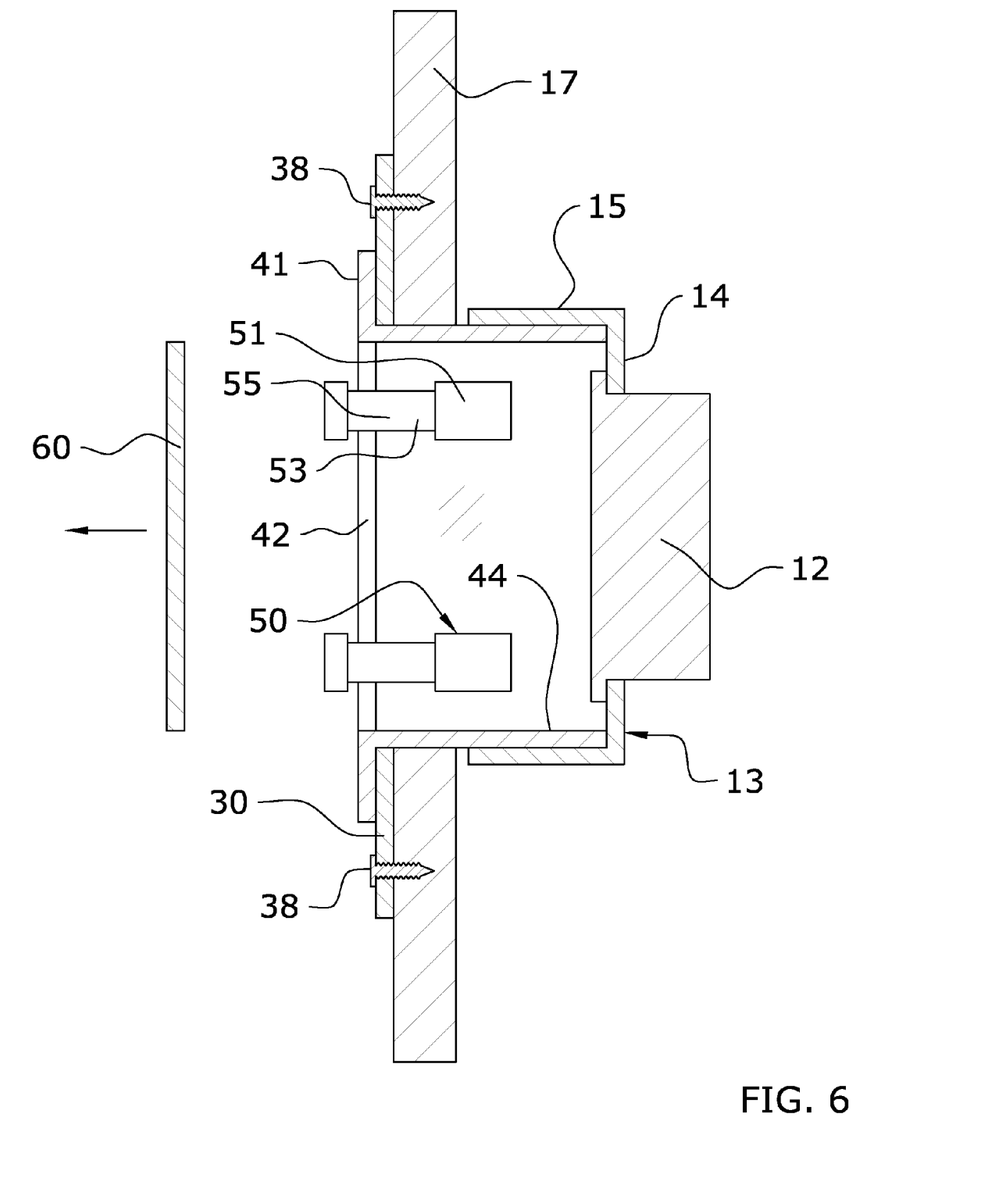
FIG. 6 is a side cross-sectional view of the present invention installed with the latches in the extended position and the cover removed.

The body 51 is attached to the flange 44 in a manner that is recessed from the opening 42 and face trim 41 of the frame 40 as illustrated in FIG. 4. The plunger 53 is adapted for inward and outward movement relative the body 51 such that an inward pushing-force applied to the plunger 53 causes the plunger 53 to be retained in a retracted position as illustrated in FIG. 4, wherein the outer end is recessed from the opening 42 and face trim 41 in the retracted position and such that an inward pushing-force applied to the plunger 53 causes the plunger 53 to be move to an extended position as illustrated in FIG. 6, wherein the outer end extends outwardly beyond the opening 42 and face trim 41 in the extended position.

Figure 5:
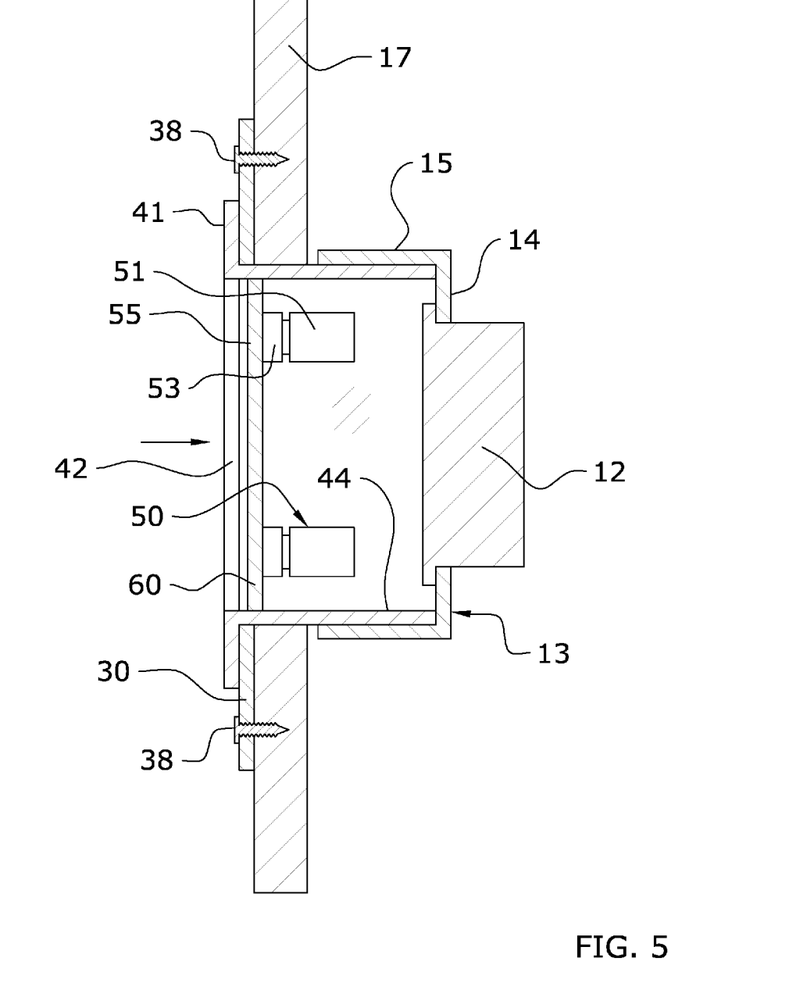
FIG. 5 is a side cross-sectional view of the present invention installed with the latches being pushed-inwardly to change positions.

The inward-pushing force is illustrated in FIG. 5 and it is appreciated that a similar inward movement of the plunger 53 is operatively-applied for movement to the retracted position from the extended position or from the extended position to the retracted position. It is also appreciated that the latches 50 generally include internal limiters or other components to retain the plunger 53 in the refracted and extended positions to permit for the inward pushing-force to cause the plunger 53 to change positions.

The exemplary catch element 55 is attached to the outer end of the plunger 53 such that the catch element 55 moves with the plunger 53 as illustrated in FIGS. 4 and 5. The cover 60 is also able to be detached from the catch element 55, preferably when access to the electrical device 12 is desired as illustrated in FIG. 6. The catch element 55 is generally comprised of a magnet that is suitable for holding the cover 60 against thereof. Alternate types of catch elements 55 may be utilized all which permit removable attachment of the cover 60 thereto, such as catch elements that employ a mechanical connection.

E. Cover

The cover 60 is generally comprised of a thin-plated structure and also generally lightweight to permit for the magnetic attraction between the cover 60 and the catch elements 55 to be suitable to retain the cover 60 to the catch elements 55. Alternately or additionally, the cover 60 may mechanically attach to the catch elements 55. The cover 60 may mechanically attach to the catch elements 55 in various manners all which permit for removable attachment. One embodiment employs a pin and socket structure, such as the catch elements 55 having or being comprised of a pin structure and the cover 60 including sockets therethrough or therein to receive the pins of the catch elements 55, or vice versa wherein the cover 60 includes pin elements and the catch element 55 has a socket extending therein to receive the pin elements of the cover 60.

The preferred embodiment illustrates a square-shaped cover 60; however it is appreciated that alternate shaped covers 60 may be suitable all which match the shape of the opening 42 of the frame 40. The cover 60 is also generally comprised of a similar size as the opening 42 of the frame 40 so that the cover 60 completely fills the opening 42. It is appreciated that the backside of the cover 60 includes magnetic attractant material such as for receiving the catch elements 55 or sockets or pins for mechanically attaching to the catch elements 55. In the preferred embodiment, the entire cover 60 is comprised of a sheet-metal material, such as for efficiently being secured to the catch elements 55.

Figure 8:
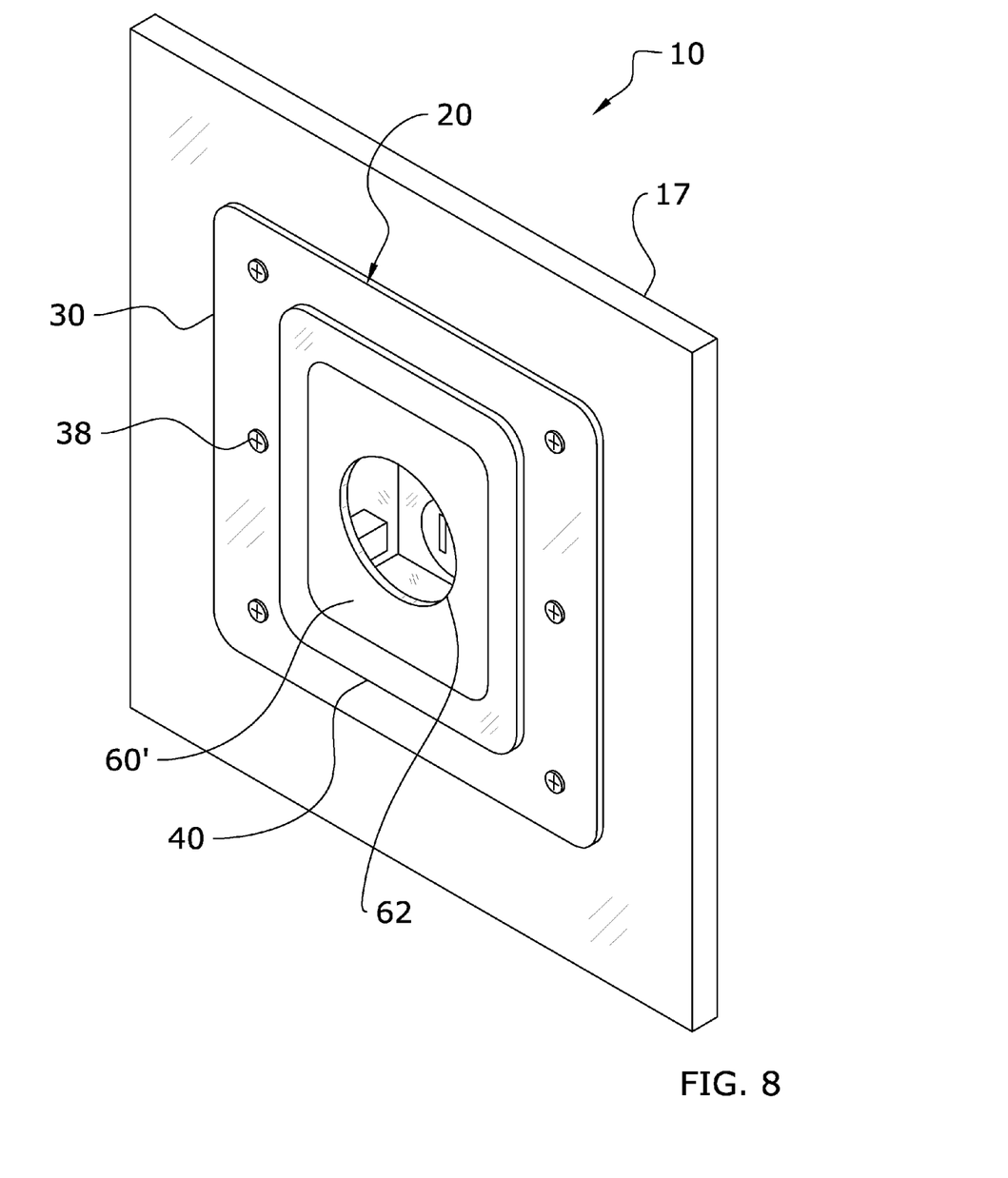
FIG. 8 is an upper perspective view of the present invention installed upon a wall panel with the alternate cover attached.

An alternate cover 60' is illustrated in FIG. 8. The cover 60' is comprised of a daily use embodiment such as which includes an opening 62 extending therethrough which permits the user to access the electrical device 12 even when the cover 60' is attached to the latches 50. The opening 62 may be of various shapes and sizes. The opening 62 may also be suitable for allowing an electrical cord to pass through when the electrical device 12 is in use.

F. Finishing Material

Figure 3:
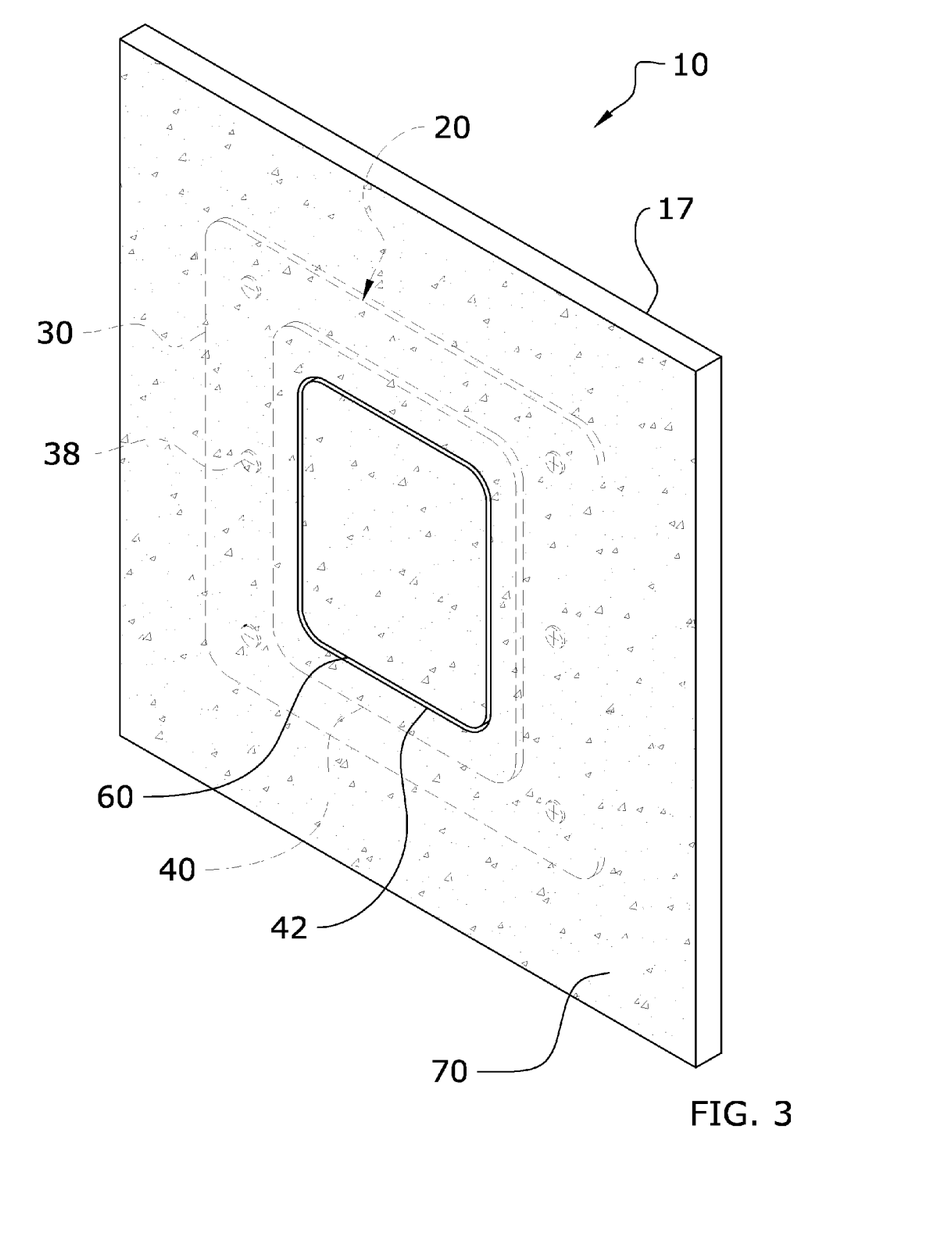
FIG. 3 is an upper perspective view of the present invention installed and a finishing material applied thereover.

Various types of finishing materials 70 may be applied over the exposed portions of the mount plate 30, the face trim 41, and the cover 60 as illustrated in FIGS. 3 and 7 to blend the present invention in with the surrounding wall panel 17 such as to render the present invention substantially unnoticeable. Such finishing materials 70 may include a textured material, a cork material, a wood material, a paint material, a wall paper material, a stone material such as granite or tile, or various others. The finishing material 70 is preferably applied over both the wall panel 17 and the present invention so the entire coat of finishing material 70 is flush. FIG. 3 has illustrates the face trim 41 and mount plate 30 in hidden lines behind the finishing material 70; however it is appreciated that normally, the face trim 41 and mount plate 30 will be completely hidden from view after application of the finishing material 70. As shown in FIG. 3, there is preferably a small gap between the perimeter of the cover 60 and the opening 42 of the frame 40 such as to permit the cover 60 to move inwardly and outwardly.

G. Operation of Preferred Embodiment

In use, the present invention is installed upon the wall panel 17 and in alignment with the electrical device 12 as illustrated in FIGS. 1 and 2. Then, a finishing material 70 is applied to the wall panel 17 and over the exposed portions of the mount plate 30, face trim 41, and cover 60 so that the present invention blends in and matches the surrounding wall panel 17. Thus, the present invention is preferably installed prior to finishing the wall panels 17; however it is appreciated that certain steps may be taken to install the present invention after the wall panels 17 have been finished. To remove the cover 60 and access the electrical device 12, an inward pushing-force is applied to the cover 60 as illustrated in FIG. 5 which causes the plungers 53 to move inwards and release to the extended position.

In the extended position, the cover 60 is supported outwardly of the face trim 41 of the frame 40 to form a gap (approximately 0.5 inches deep) between the cover 60 and the face trim 41 which permits a user to grasp the cover 60. The cover 60 may then be safely removed from the latches 50 without the risk of electrical shock from the electrical device 12 via simply pulling the cover 60 away from the latches 50 with an outward force to overcome the magnetic or mechanical force of the catch elements 55 as illustrated in FIG. 6. After use of the electrical device 12 the cover 60 may be replaced upon the latches 50 and an inward force is applied to the cover 60 which causes the plungers 53 to be retained in the refracted position as illustrated in FIG. 4.

In one embodiment with the cover 60 removed or the daily cover 60' attached, the recessed electrical device 12 may be comprised of an electrical outlet which receives an electrical plug of a flat-screen television or other appliance. The television may be mounted to the wall panel 17 directly over the present invention wherein the recessed depth of the electrical device 12 permits for the entire electrical plug to be contained within the frame 40 of the present invention without protruding outwardly from the frame 40. The present invention may also be used as a tamper-proof accessory, wherein the cover 60 hiding the electrical device 12 prevents or eliminates the risk of electrical shock by children or pets since the electrical device 12 will be concealed and hidden from view.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An electrical device concealing system, comprising:
   an electrical device;

a wall or ceiling panel having a first opening, wherein said first opening leads to said electrical device;

a mount plate having a second opening, mount plate is secured to said wall or ceiling panel such that said second opening aligns with said first opening;

a frame having a face trim defining a third opening and a plurality of flanges, wherein said face trim is positioned flat against said mount plate such that said third opening aligns with said second opening and wherein said plurality of flanges extend inwardly from said face trim;

a plurality of operative-latches attached to one or more of said plurality of flanges, wherein said plurality of flanges are adapted for inward and outward movement relative said frame; and a cover removably connected to said plurality of operative-latches, wherein said cover is adapted to conceal said first opening, said second opening, and said third opening such as for concealing said electrical device;

wherein said cover moves inwardly and outwardly with said plurality of operative-latches such that said cover is substantially flush with said face trim of said frame in a first position such as to conceal said electrical device and such that said cover is positioned outwardly from said face trim of said frame in a second position such as to permit removal of said cover from said plurality of latches to expose said electrical device.

2. The electrical device concealing system of claim 1, wherein said electrical device includes a mounting box, wherein said plurality of flanges are retained within said mounting box.

3. The electrical device concealing system of claim 1, wherein said electrical device is comprised of an electrical outlet.

4. The electrical device concealing system of claim 1, wherein said electrical device is comprised of a communications socket.

5. The electrical device concealing system of claim 1, wherein said electrical device is comprised of an electrical switch.

6. The electrical device concealing apparatus of claim 1, wherein said cover is magnetically connected to said plurality of operative-latches.

7. The electrical device concealing apparatus of claim 1, wherein said cover is mechanically connected to said plurality of operative-latches.

8. The electrical device concealing apparatus of claim 1, wherein said plurality of operative-latches each comprise:

a body mounted to one of said plurality of flanges, said body being recessed from said face trim;

a biased-plunger having an outer end and supported by said body, said biased-plunger adapted for inward and outward movement relative said body such that a first inward pushing-force applied to said biased-plunger causes said biased-plunger to be retained in a retracted position, wherein said outer end is recessed from said face trim in said retracted position and such that a second inward pushing-force applied to said biased-plunger causes said biased-plunger to be move to an extended position, wherein said outer end extends outwardly beyond said face trim in said extended position; and a magnetic catch element attached to said outer end of said biased-plunger such that said magnetic catch element moves with said biased-plunger from said retracted position to said extended position;

wherein said cover is magnetically connected to said magnetic catch element.

9. The electrical device concealing apparatus of claim 1, including a finish material applied over an exposed portion of said mount plate, said face trim, and said cover, said finish means adapted to match a surrounding said wall or ceiling panel.

10. The electrical device concealing apparatus of claim 9, wherein said finish material is comprised of a textured material, a cork material, a wood material, a paint material, a wall paper material, or a stone material.

11. An electrical device concealing apparatus suitable for mounting to a wall panel, ceiling panel, or the like, comprising:

a mount plate having a first opening, wherein said mount plate is secured to the wall or ceiling panel such that said first opening aligns with an electrical device;

a frame having a face trim defining a second opening and a plurality of flanges, wherein said face trim is positioned flat against said mount plate such that said second opening aligns with said first opening and wherein said plurality of flanges extend inwardly from said face trim;

a plurality of operative-latches attached to one or more of said plurality of flanges, wherein said plurality of flanges are adapted for inward and outward movement relative said frame;

wherein said plurality of operative-latches each comprise a body mounted to one of said plurality of flanges, said body being recessed from said face trim, a biased-plunger having an outer end and supported by said body, said biased-plunger adapted for inward and outward movement relative said body such that a first inward pushing-force applied to said biased-plunger causes said biased-plunger to be retained in a retracted position, wherein said outer end is recessed from said face trim in said retracted position and such that a second inward pushing-force applied to said biased-plunger causes said biased-plunger to be move to an extended position, wherein said outer end extends outwardly beyond said face trim in said extended position, and a magnetic catch element attached to said outer end of said biased-plunger such that said magnetic catch element moves with said biased-plunger from said refracted position to said extended position;

a cover removably and magnetically connected to said plurality of operative-latches, wherein said cover is adapted to conceal said first opening and said second opening such as for concealing the electrical device;

wherein said cover moves inwardly and outwardly with said plurality of operative-latches such that said cover is substantially flush with said face trim of said frame in a first position such as to conceal the electrical device and such that said cover is positioned outwardly from said face trim of said frame in a second position such as to permit removal of said cover from said plurality of latches to expose the electrical device; and a finish material applied over an exposed portion of said mount plate, said face trim, and said cover to match a surrounding wall or ceiling panel, wherein said finish material is comprised of a textured material, a cork material, a wood material, a paint material, a wall paper material, or a stone material.

* * * * *